S. C. JANTZEN.
Coffee-Mills.
No. 139,960.　　　　　　　　　　Patented June 17, 1873.
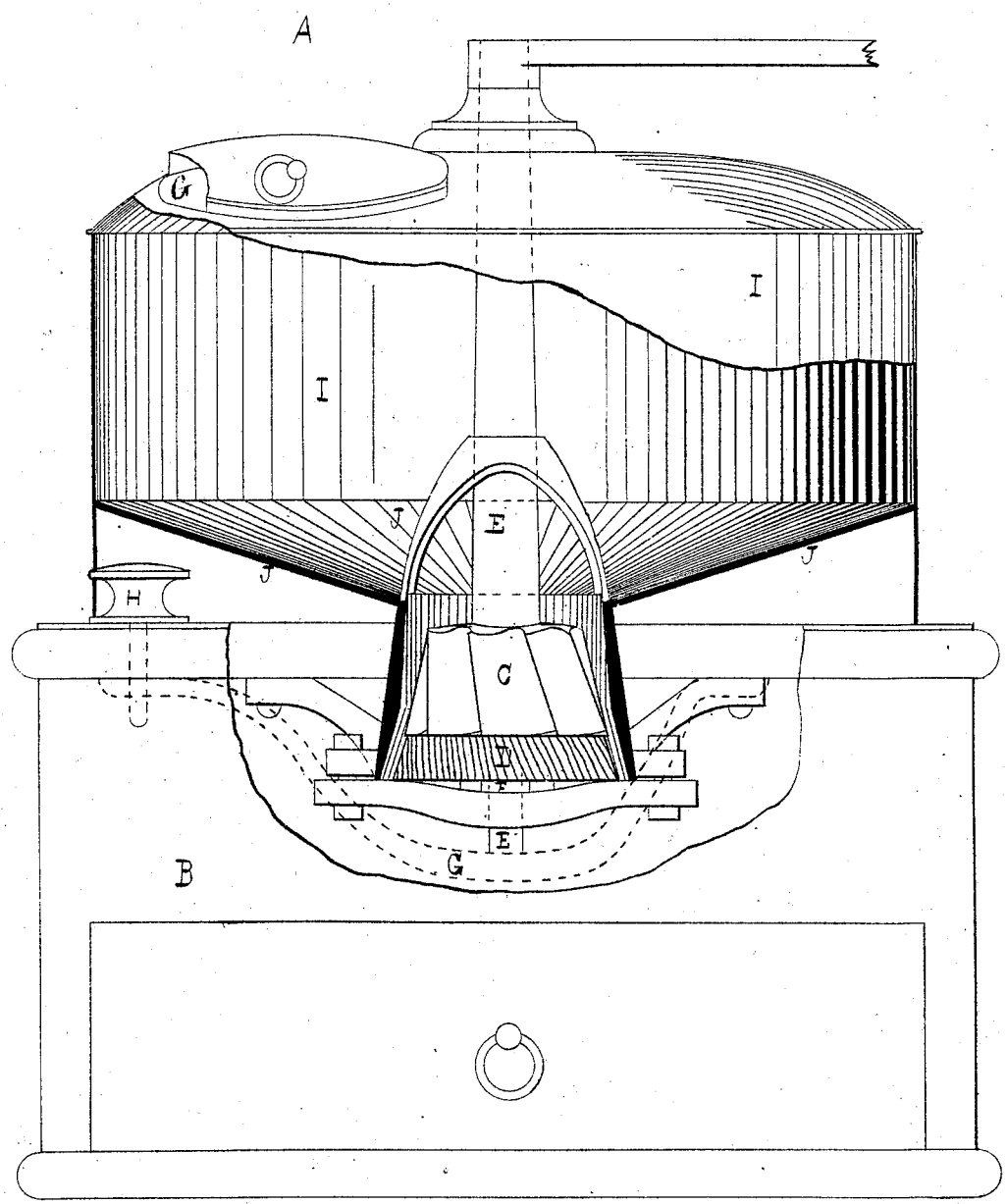

UNITED STATES PATENT OFFICE.

SIMON C. JANTZEN, OF PHILADELPHIA, PENNSYLVANIA.

IMPROVEMENT IN COFFEE-MILLS.

Specification forming part of Letters Patent No. 139,960, dated June 17, 1873; application filed November 19, 1872

*To all whom it may concern:*

Be it known that I, SIMON C. JANTZEN, of the city and county of Philadelphia, and State of Pennsylvania, have invented an Improved Coffee-Mill, of which the following is a specification:

The invention consists in the combination of a canister with grinding devices so constructed that the material to be ground is fed directly from the canister to the grinding devices.

The accompanying drawing is an elevation, partly sectioned.

A is a coffee-mill; B, the box of the same. The cutter or chopper C, and the grinder D, are made in distinct separate pieces, so that either or both can be taken from the spindle E and sharpened or repaired separately. In the present instance the chopper C forms part of the spindle. The grinder D is detachable by unscrewing the nut F. Their grooves or cutting-edges can be made to conform each to its respective work of chopping or grinding, which is impossible in mills in which the chopper and grinder are made in one. G is a graduating lever, which is placed diagonally at the top of the box B, shown in dotted lines. It carries the spindle E. The feed or cut of the mill is regulated by the adjusting-screw H, which elevates and depresses the lever G. I is an inclosed canister on the box B. It is of sufficient capacity to hold coffee for several days' use. Its bottom J converges downwardly toward the openings a in the spindle-guide, which empty into the mill.

The coffee is put into the canister through an opening, G', in the top. The aroma of the coffee is preserved, and its quality is prevented from deteriorating when inclosed from the outer air.

I claim as my invention—

The combination of the canister I, constructed substantially as described, with the grinding devices C and D, as and for the purpose shown and described.

In testimony whereof I hereunto sign my name in presence of two subscribing witnesses.

SIMON C. JANTZEN.

Witnesses:
 FRANCIS D. PASTORIUS,
 EDMUND P. COCHRAN.